BINAURAL FUSION LISTENING SYSTEM

Filed May 27, 1966 4 Sheets-Sheet 1

INVENTOR
H. LEVITT
BY G. E. Hirsch
ATTORNEY

March 31, 1970 H. LEVITT 3,504,120

BINAURAL FUSION LISTENING SYSTEM

Filed May 27, 1966 4 Sheets-Sheet 4

United States Patent Office 3,504,120 Patented Mar. 31, 1970

3,504,120

BINAURAL FUSION LISTENING SYSTEM

Harry Levitt, East Orange, N.J., assignor to Bell Telephone Laboratories, Incorporated, Murray Hill, N.J., a coporation of New York Filed May 27, 1966, Ser. No. 553,555
Int. Cl. H04v 5/00
U.S. Cl. 179—1 9 Claims

ABSTRACT OF THE DISCLOSURE

A system is disclosed for selectively listening to one of a number of different audible messages which are presented together to the operator through earphones. A delay is introduced into each message signal reaching one ear, the delay being different for each signal. A particular message signal is selected by delaying the total signal reaching the other ear by the same delay as that of the selected message signal. To the operator the selected message signal will binaurally "focus" in the center of his head and thus stand out from the other signals which become background noise.

Figure 1:
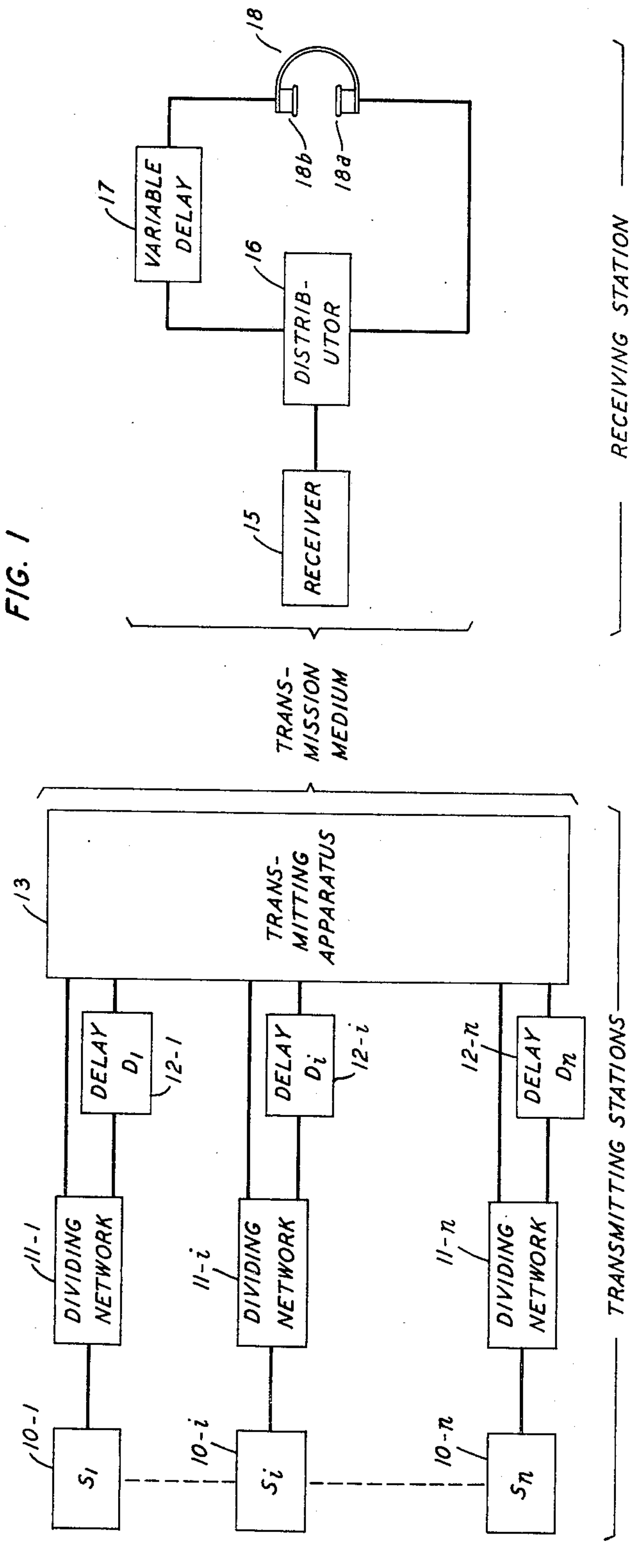

This invention relates to the transmission of speech messages and in particular to the simultaneous transmission of a plurality of messages over a limited number of transmission channels. It is an object of this invention to allow a person to listen selectively to one of a plurality of messages while at the same time monitoring the remaining messages.

It is often deisrable that one person, for example, a police or taxi dispatcher, or control tower operator, simultaneously monitor a plurality of message sources. It is also often desirable that the transmission bandwidth utilized by a plurality of sources be kept as small as possible, compatible with the transmission of intelligible information. One method of achieving both these objectives makes use of the fact that a listener monitoring speech or other sounds with earphones usually hears the speech or sounds near or in the center of his head. This phenomenon is known as "binaural fusion." It has been observed that the apparent location of the sound image in the head of the listener shifts as the strength, or time of arrival, of the sound at one ear varies with respect to the strength or time of arrival of the sound from the same source at the other ear. Thus, if speech sounds from several message sources are delivered to both ears of a listener and the arrival time or amplitude of each sound at one ear is made to differ uniquely from the arrival time or amplitude of the sound from the same source at the other ear, the sound components from each source can be made to fuse at a unique position within the listener's head. With practice, it is thus possible for a listener to monitor simultaneously several sources and to "tune in" to the message from a selected source by focusing his attention on the spatial location of this message within his head. The number of sources which can be monitored simultaneously depends, among other things, on the number of unique spatial locations which can be assigned within the head of a listener. Unfortunately, the number of unique locations is limited. Moreover, when the sound levels of the messages from all the sources are comparable, there is a good deal of mutual interference between the messages.

This invention concerns an improved monitoring system which avoids the above problems. It is based on the realization that with speech and other aperiodic stimuli, binaural fusion breaks down when the interaural delay between the two components of a message from a given source is greater than about 5 to 20 milliseconds. With such a breakdown, each component of the message is heard monaurally; i.e., separately and slightly less loudly at each ear.

According to this invention, the message from a selected source only is heard "binaurally," i.e., as a single fused sound image within the head of the listener. Messages from the remaining sources are heard monaurally. As a result, the signal level required for a given intelligibility of the binaurally-perceived mesage is considerably less than if all messages are heard binaurally. The number of message sources which can be simultaneously monitored is increased over the prior art systems because only one message at a time is fused in the head of the listener. In addition, a considerable saving in transmission bandwidth is achieved since, according to this invention, only a small number of channels are required to transmit messages from a large number of sources.

In one embodiment of this invention, each of a plurality of messages is divided into two components at its source and one of these components is delayed at the source by an amount unique to that source. Each message source has a unique delay "assignment," which differs from all other sources in the system. Two components of each message are then transmitted to separate receivers, i.e., transducers such as earphones, associated with the individual ears of a listener together with similarly processed components of messages from other sources. A listener hears binaurally a message from a selected source by introducing a complementary delay in the undelayed components equal to the delay assigned to the selected source. The delays assigned to the message sources are selected so that breakdown of fusion occurs for all the undesired messages. These "other" messages are thus heard monaurally and at a level below the level of the selected, binaurally-fused message.

Figure 2:
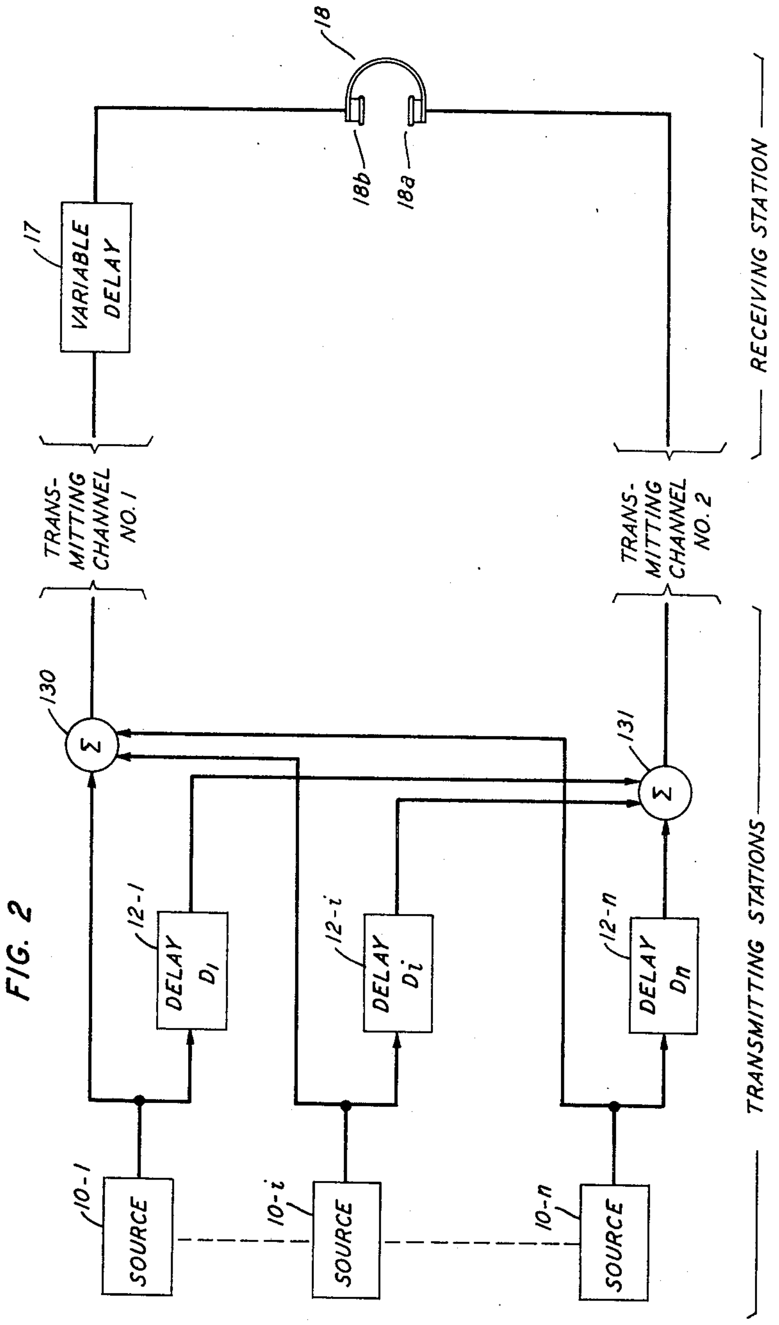
Figure 3:
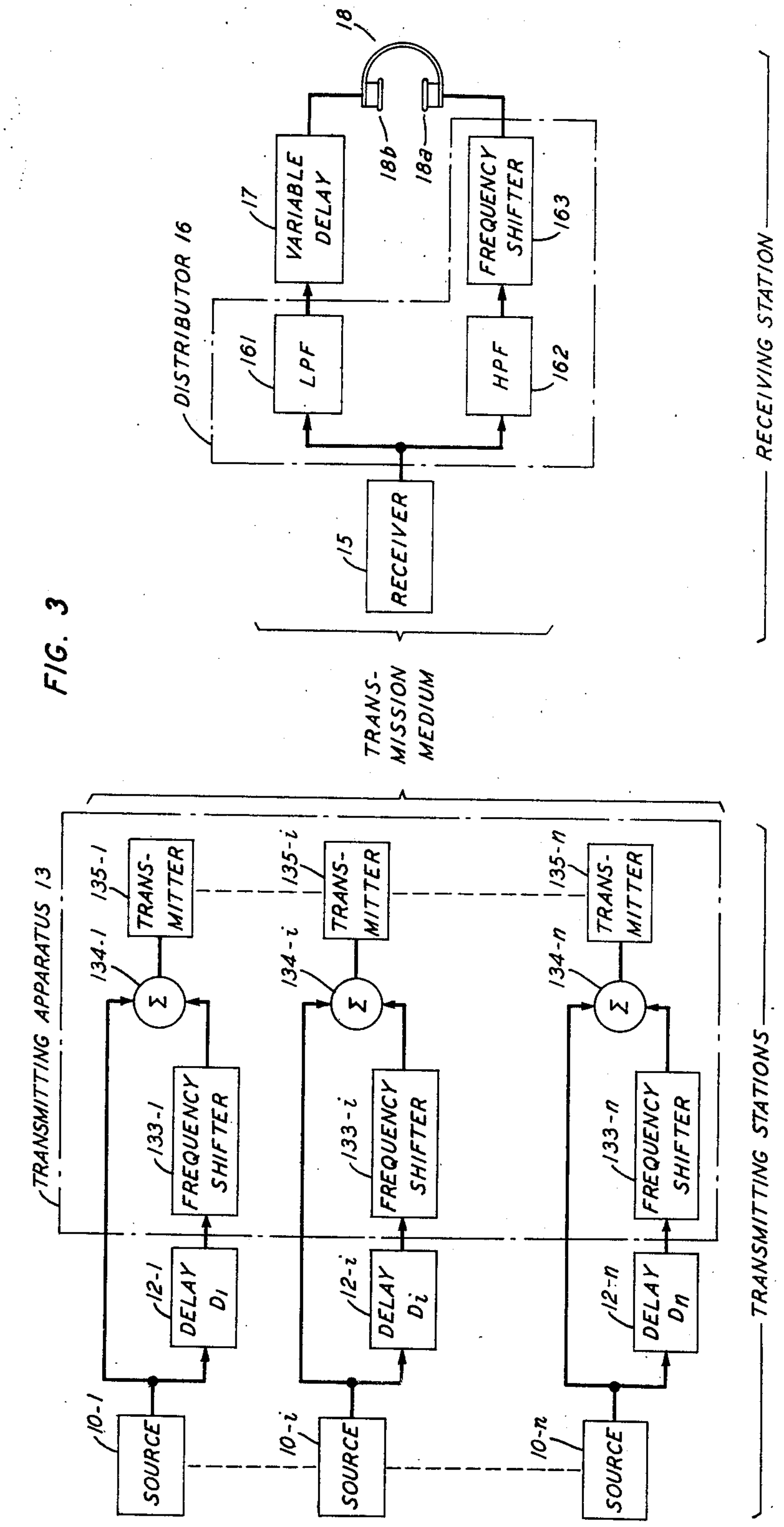
Figure 4:
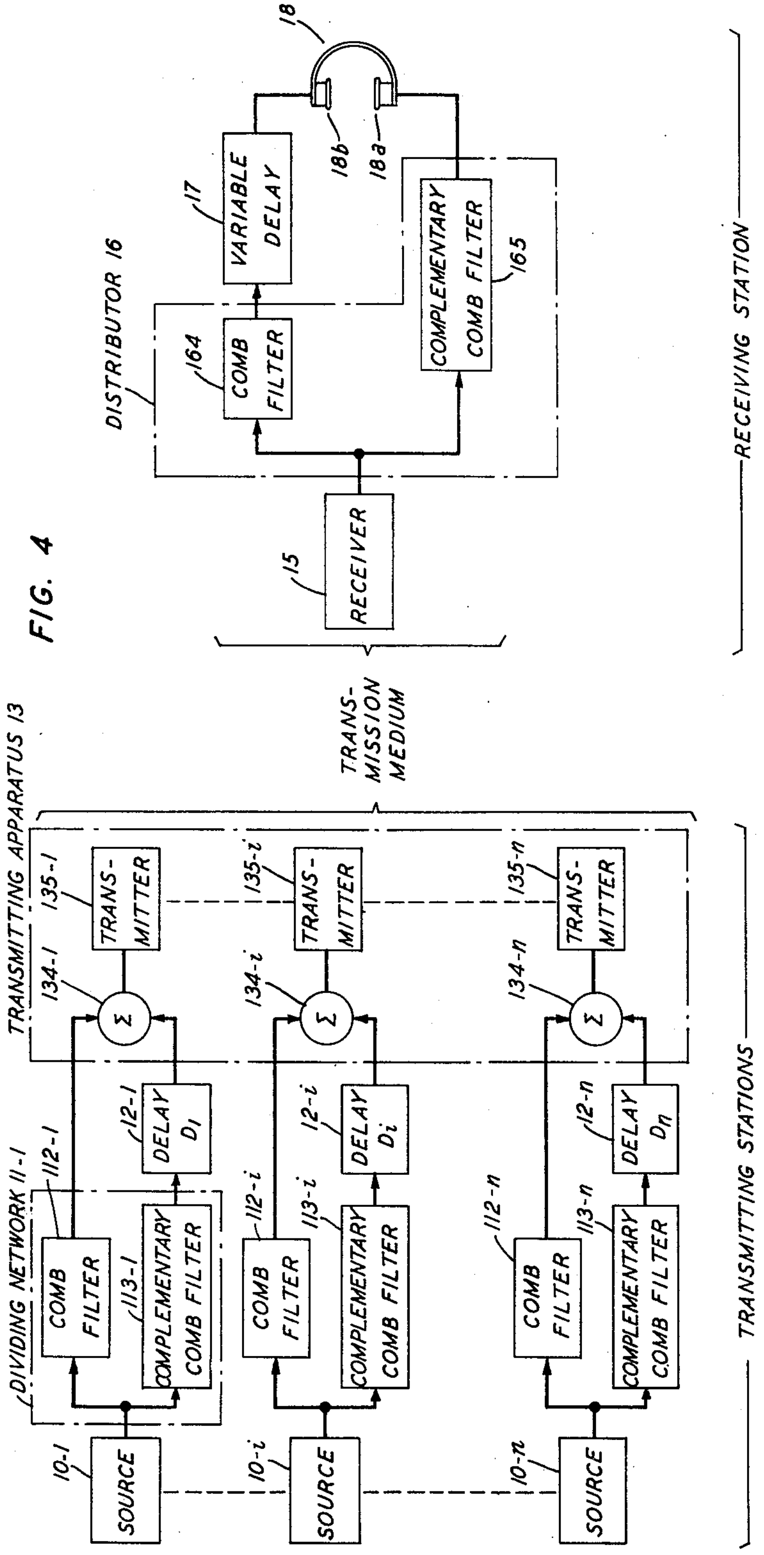

This invention may be more fully understood from the following detailed description of the operation of preferred embodiments thereof together with the drawings in which:

FIG. 1 is a block diagram of a general embodiment illustrating the principles of this invention; and FIGS. 2, 3, and 4 are block diagrams of specific embodiments of this invention.

Before describing the drawings, it should be mentioned that the phenomenon of binaural fusion is not well understood. No detailed quantitative investigation of the factors controlling the breakdown of fusion has been carried out. However, it is well known that when the ears of a listener are stimulated diotically, that is, when two identical components of a given sound arrive simultaneously at the ears of a listener, a binaural sound image appears which is perceived in the center of the head. It is also well known that when the ears of a listener are stimulated dichotically, that is, with different stimuli, the listener can under certain conditions still form a binaural sound image through not necessarily in the center of the head. Thus, two nonidentical components of a given speech sound can, in certain cases, be made to fuse in the head of a listener. Moreover, if the relative delay between two otherwise identical components of a given sound is less than approximately 5 to 20 milliseconds but greater than zero, the two sound components will appear to form a single fused sound image within, but to one side of, the head of a listener. However, if the relative delay between two otherwise identical components of a given aperiodic sound is greater than approximately 20 milliseconds, the listener is usually unable to fuse the two components into a single sound image. Rather, the listener usually hears each component "monaurally"; that is, as though at each ear it came from a separate source outside the head.

The relative delay between the two components of a given speech sound at which a binaural sound image breaks into two monaural sound images varies from listener to listener. However, it is possible to select the delays associated with a large number of message sources such that only one source can be heard binaurally at any one time. Further, it is evident from the above discussion that the relative delay between the two components of a given sound does not have to be zero to enable a listener to bear the given sound binaurally.

In the above discussion, a *binaural sound image* is defined as a single fused sound image in the head of the listener resulting from diotic or dichotic stimulation of the ears of the listener, and a *monaural sound image* is defined as a sound image heard through one ear only. It should be noted that if fusion does not occur, dichotic stimulation will give rise to two separate monaural sound images, one at each ear.

More detailed discussion of diotic and dichotic sound stimuli and their effects can be found in J. C. R. Licklider, "Basic Correlates of the Auditory Stimulus," Chapter 25 of Handbook Experimental Psychology edited by S. S. Stevens, John Wiley and Sons, New York, 1951.

FIG. 1 shows a general embodiment of this invention. Messages or signals from $n$ sources 10–1 through 10–$n$ are each divided into two components by networks 11–1 through 11–$n$, where $n$ is a selected positive integer. Prior to transmission, one of the two components of the message from source 10–$i$ is delayed in the corresponding delay 12–$i$ by an amount unique to the $i^{th}$ source, where $i$ is an integer given by the relation $1<i<n$.

The delay 12–1 associated with a particular source 10–$i$ differs from the delays associated with the other sources by an amount sufficient to ensure that when the message from the $i^{th}$ source is heard binaurally by a listener with earphones, the messages from all the other sources are heard monaurally. Delays differing by 20 milliseconds or more are usually sufficient for this purpose.

The delayed and the undelayed message components are sent to a receiving station over a selected transmission medium by way of transmitting apparatus 13. The type of transmission system and transmission medium employed is immaterial to this invention.

At the receiving station, the transmitted message components are detected by receiver 15. Distributor 16 separates the delayed from the undelayed message components and sends the delayed message components directly to one ear of a listener through earphone **18*a*. The undelayed message components are sent through variable delay 17 and earphone 18*b*** to the other ear of the listener.

The listener hears the message from a particular source binaurally by setting variable delay 17 to the delay associated with the selected source. As a result, the two components of the message from the selected source arrive in time synchrony at the ears of the listener and form a single fused sound image; the two components of each of the messages from the other sources arrive at the ears of the listener out of synchrony by various amounts greater than approximately 20 milliseconds and thus are heard monaurally. Because the desired message is heard binaurally it is easily separated from the monaurally-perceived messages. In fact, the monaurally-perceived messages are individually of low intelligibility, but together appear as an incoherent and generally unintelligible background babble. As such, they interfere little, if any, with the selected message. The listener can rapidly switch from message to message by appropriately varying delay 17.

FIG. 2 shows one specific embodiment of this invention. In FIG. 2, messages or signals from sources 10 are transmitted simultaneously over two transmission channels to a listener wearing earphones 18. Prior to transmission, the message from a given source 10–$i$ is divided into two identical components. One of these components is sent directly to summing network 130 where it is combined with similarly derived undelayed message components from other sources. These combined undelayed components are transmitted to the listener over transmission channel No. 1. The other component is delayed in a corresponding delay 12–$i$ by an amount unique to its source. The delayed components of the messages from all the sources are summed in network 131 prior to transmission to a listener over transmission channel No. 2.

Although the particularly type of transmission channel utilized is immaterial to this invention, channels 1 and 2 can correspond, for example, to the upper and lower sidebands respectively of a double sideband modulation system. Such transmission systems are well known and thus will not be described in detail.

At a receiving station the message components from all the sources are sent to a listener over two channels. All the message components delayed prior to transmission are sent directly to one ear of a listener by means of earphone **18*a*. The undelayed message components are passed through variable delay 17 and sent to the other ear of the listener by means of earphone 18*b*. The listener hears binaurally the message from a selected source by setting variable delay 17** to the delay associated with the selected source. All other messages are heard monaurally.

FIG. 3 shows another embodiment of this invention. The message from each source 10–$i$ is again divided into two identical components. One component is delayed in network 12–$i$ by an amount unique to the source and is then shifted in frequency by shifter 133–$i$ to occupy a frequency band outside the frequency band of the undelayed component. The delayed and undelayed components are summed in network 134–$i$ and then transmitted by transmitter 135–$i$ over a selected channel to receiver 15 at a receiving station. The messages from all sources are transmitted to the receiver at the same carrier frequency over the same transmission channel in accordance with well-known techniques. These techniques per se form no part of this invention.

The received signal is divided into two subsignals occupying separate frequency bands by low-pass filter 161 and high-pass filter 162. Filter 161 passes the undelayed message components while filter 162 passes the delayed message components. The delayed message components are returned to their original frequency range in shifter 163 and sent without further delay to one ear of a listener by means of earphone **18*a*. The undelayed message components are passed by filter 161, delayed by variable delay 17 and sent by means of earphone 18*b* to the other ear of the listener. A message from a selected source is heard binaurally by setting delay 17** to the delay associated with the selected source. All other messages are heard monaurally.

A fourth embodiment of this invention is shown in FIG. 4. In this embodiment, the message from each source 10–$i$ is divided into two components by means of two complementary comb filters 112–$i$ and 113–$i$. Each component contains a plurality of subsignals occupying noncontiguous frequency bands. For optimum system performance, the total bandwidth of the set of subsignals comprising one component is approximately equal to the total bandwidth of the set of subsignals comprising the other component. The bandwidths of each subsignal in each component may, for example, vary from 100 to 300 cycles per second.

The message component from source 10–$i$ passed by comb filter 113–$i$ is delayed in delay 12–$i$ by an amount unique to the source, and is then recombined in network 134–$i$ with the undelayed component passed by filter 112–$i$. The recombined components are transmitted to a receiving station by transmitter 135–$i$. Because of the complementary comb filters, the bandwidth occupied by the transmitted signal is equal to the bandwidth of one message. As discussed previously, each transmitter 135–$i$ broadcasts signals possessing approximately the same bandwidth on the same carrier frequency and, since there are $n$ transmitters, receiver 15 at the receiving station can detect up to $n$ simultaneous messages.

The signals detected by receiver 15 are divided into two components by comb filters 164 and 165. Filter 164 is identical in characteristics to the $n$ filters 112 associated with the $n$ sources while filter 165 is identical to the $n$ filters 113. Filter 164 thus passes the undelayed message components while filter 165 passes the delayed message components. The undelayed message components are passed through variable delay 17 and then sent to one ear of a listener through earphone **18*b*. The delayed message components are sent without further delay to the other ear of the listener through earphone 18*b*. A message from a selected source is again heard binaurally by setting delay 17** to the delay associated with the selected source. Despite the fact that the filtered message component at each ear occupies only a fraction of the bandwidth occupied by the selected message, the two components in time-synchrony appear to fuse as a single sound image in the head of the listener while the other unsynchronized message components are heard monaurally from outside the head.

Other embodiments of this invention will be obvious to those skilled in the speech transmission and acoustic arts. In particular, embodiments in which the two components of a message are generated by the rapid switching of a message from one transmission channel to another will be obvious based on the above descriptions. Further, while the invention has been described in terms of a single listener, it is obvious that in accordance with the principles of the invention, several persons can simultaneously listen to several different sources.

What is claimed is:

1. In combination a plurality of sources for generating a plurality of signals;

means for producing two components of each of said signals;

means for delaying one component of each signal an amount unique to said signal;

means for sending all components to a receiving station, said station including means for distributing each component of each signal to a corresponding one of two transducers, one at each ear of a listener; and means controlled by said listener for varying the relative delay between the two components of each of said plurality of signals by a selected amount so that the two components of a selected signal are heard binaurally.

2. Apparatus as in claim 1 in which said producing means comprise means for dividing each of said signals into two identical components.

3. Apparatus as in claim 2 in which said sending means comprise first means for combining all delayed signal components;

second means for combining all undelayed signal components;

first means for transmiting over a first transmission channel said combined, delayed signal components; and second means for transmitting over a second transmission channel said combined, undelayed signal components.

4. Apparatus as in claim 1 in which said sending means comprise means for shifting said delayed component of each signal to a second frequency band outside the frequency band occupied by the undelayed component of each signal;

means for combining said delayed and said undelayed components of each signal; and means for transmitting said delayed and undelayed components of each signal to a receiving station.

5. Apparatus as in claim 1 in which said sending means comprise means for shifting said delayed component of each signal to a second frequency band outside the frequency band occupied by the undelayed component of each signal; and means for transmitting said delayed and undelayed components of each signal to a receiving station.

6. Apparatus as in claim 4 in which said distributing means and said varying means comprise a receiver for detecting said transmitted signal components;

a low-pass filter for passing said undelayed signal components;

a high-pass filter for passing said delayed signal components;

a frequency shifter in series with said high-pass filter for shifting said delayed components to their original frequency band;

a variable delay in series with said low-pass filter for delaying all undelayed components a selected amount; and a first and a second earphone connected in series with said frequency shifter and said variable delay respectively.

7. Apparatus as in claim 1 in which said producing means comprise a first plurality of comb filters corresponding on a one-to-one basis to said plurality of sources for dividing each of said plurality of signals into a first set of subsignals occupying first selected bandwiths; and a second plurality of comb filters corresponding on a one-to-one basis to said plurality of sources for dividing each of said plurality of signals into a second set of subsignals occupying bandwidths complementary to said first selected bandwidths.

8. Apparatus as in claim 1 in which said distributing means and said varying means comprise a receiver for detecting said transmitted signal components;

a first comb filter for passing said undelayed signal components;

a second comb filter for passing said delayed signal components;

a variable delay in series with said first comb filter for delaying all said undelayed components a selected amount; and a first and a second earphone connected in series with said variable delay and said second comb filter respectively.

9. In combination a plurality of sources for generating a plurality of signals;

means for producing two components of each of said signals;

means for delaying one component of each signal an amount unique to said signal;

means for distributing each component of each signal to a coresponding one of two transducers, one at each ear of a listener; and means for varying the relative delay between the two components of each of said plurality of signals by a selected amount so that the two components of a selected signal are heard binaurally.

References Cited

UNITED STATES PATENTS

| | | | |
|---|---|---|---|
| 2,880,275 | 3/1959 | Kahn | 179—15 |
| 2,920,138 | 1/1960 | Fogel | 179—1 |

RALPH D. BLAKESLEE, Primary Examiner